United States Patent [19]

Wachi

[11] Patent Number: 4,543,650
[45] Date of Patent: Sep. 24, 1985

[54] SERVO SYSTEM INCLUDING VELOCITY AND PHASE SERVO CIRCUITS FOR DIGITAL AUDIO RECORD DISC REPRODUCING APPARATUS

[75] Inventor: Shigeaki Wachi, Higashikurume, Japan

[73] Assignee: Sony Corporation, Tokyo, Japan

[21] Appl. No.: 362,502

[22] Filed: Mar. 26, 1982

[30] Foreign Application Priority Data

Mar. 26, 1981 [JP] Japan .................................. 56-45239

[51] Int. Cl.$^4$ ............................ G11B 7/00; G11B 7/02
[52] U.S. Cl. ......................................... 369/43; 369/50
[58] Field of Search ....................... 369/43, 44, 50, 59, 369/240, 267

[56] References Cited

U.S. PATENT DOCUMENTS

| | | | |
|---|---|---|---|
| 4,223,349 | 9/1980 | Dakin et al. | 369/50 |
| 4,338,629 | 7/1982 | Oprandis et al. | 369/50 X |
| 4,338,683 | 7/1982 | Furukawa et al. | 369/50 |
| 4,397,011 | 8/1983 | Ogawa | 369/50 |
| 4,418,406 | 11/1983 | Ogawa | 369/124 |
| 4,439,849 | 3/1984 | Nabeshima | 369/50 |

FOREIGN PATENT DOCUMENTS

| | | |
|---|---|---|
| 1288659 | 9/1972 | United Kingdom . |
| 2085199 | 9/1981 | United Kingdom . |
| 2097560 | 11/1982 | United Kingdom . |

Primary Examiner—Aristotelis M. Psitos
Attorney, Agent, or Firm—Lewis H. Eslinger; Alvin Sinderbrand

[57] ABSTRACT

In an apparatus for reproducing, from a record disc, audio information recorded in the form of a pulse code modulation (PCM) in a run length limited code, a reproduced signal derived from the rotated record disc, for example, by a pick-up in the form of photo detector in the case of optical recording and reproducing, is compared with a first reference level or signal to provide an output signal corresponding to the reproduced signal and having portions of opposite polarities, the interval between transitions from one to the other of the opposite polarity portions of the output signal is detected for providing a corresponding detecting signal, a velocity servo circuit compares the detecting signal with a second reference signal which corresponds, for example, to a maximum transition interval when the record disc is driven at a predetermined linear velocity at the location scanned by the pick-up, so as to produce a corresponding velocity control signal for maintaining the record medium at such predetermined linear velocity, a first time constant circuit is included in the velocity servo circuit for determining the rate of response thereof to any deviation from the predetermined linear velocity, a phase servo circuit has a phase locked loop for producing a phase signal from the reproduced signal which is compared with a reference phase signal so as to produce a corresponding phase control signal for maintaining a predetermined phase of the reproduced signal when the record disc is driven at the predetermined linear velocity, and a second time constant circuit is included in the phase servo circuit for determining the rate of response thereof to any deviation from the predetermined phase and has a time constant smaller than that of the first time constant circuit so that the phase control signal can be composed with the velocity control signal for simultaneously influencing the drive of the record disc.

19 Claims, 23 Drawing Figures

SERVO SYSTEM INCLUDING VELOCITY AND PHASE SERVO CIRCUITS FOR DIGITAL AUDIO RECORD DISC REPRODUCING APPARATUS

BACKGROUND OF THE INVENTION

1. Field of the Invention

This invention relates generally to an apparatus for reproducing an audio or other information signal recorded on a record disc as a pulse code modulation (PCM) in a run length limited code, and more particularly is directed to a servo system for controlling the rotation of the record disc in such reproducing or playback apparatus.

2. Description of the Prior Art

It is known to provide a digital audio record disc similar to a so-called video record disc, and in which a PCM audio signal is recorded as a series of pits or recesses arranged in a spiral track on the record disc. For reproducing or playing-back such digital audio record discs, it has been proposed to provide playback apparatus of various types, such as, optical, electrostatic-capacity or other types. A digital audio record disc may have a PCM signal recorded thereon for playback or reproducing while the disc is rotated at a constant angular velocity, or while the disc is rotated at a constant linear velocity at the location where the transducer or pick-up is scanning the record disc for detecting the recorded signal. In order to maximize the recording density, it is preferable that the digital audio signal be recorded on the disc for playback at a constant linear velocity.

In the case where the audio PCM signal is recorded in a spiral track on the record disc, the transducer or pick-up for reproducing the recorded signal is moved radially in respect to the rotational center of the disc as the reproducing operation proceeds and, therefore, the angular velocity at which the record disc is rotated has to be varied with time to ensure the maintenance of the desired constant linear velocity at the location where the transducer or pick-up scans or reproduces the signal recorded in the record disc. For varying the angular velocity at which the record disc is driven so as to maintain a constant linear velocity at the location where the transducer or pick-up scans the disc, it has been proposed to couple a potentiometer with the pick-up so that the position of the movable tap of the potentiometer changes with changes in the radial distance of the pick-up from the center of the rotated disc. Since the required angular velocity or rotational speed of the record disc varies inversely with the distance from the pick-up to the center of rotation of the record disc, a detected output can be obtained from the potentiometer and fed to a voltage divider through which a control signal is obtained for controlling the speed of the motor by which the record disc is driven. However, in the foregoing arrangement, the potentiometer acting as a pick-up position detector and the voltage divider for providing the control signal are relatively expensive and complicate the construction of the apparatus.

In producing a PCM audio record disc of the optical type, an original or master disc is initially produced through the use of a laser beam which is optically modulated by a signal to be recorded for providing pits or recesses spaced apart along a record track on the master disc in response to the level "1" or "0" of the signal being recorded. Thereafter, in a record pressing process similar to that employed for the production of conventional analog audio record discs, successive digital or PCM audio discs are replicated from the original or master disc. However, by reason of conditions encountered during the production of the master disc or during the replication of the PCM audio record discs from the master disc, so-called asymmetry may arise, that is, the sizes of the pits may be changed uniformly so as to be, either all increased or all decreased. Thus, if a signal to be recorded has an ON-OFF ratio of 50%, the corresponding signal, when reproduced from a PCM audio record disc which has encountered asymmetry in its production, will have an ON-OFF ratio other than 50%. In such case, when the reproduced signal is converted to a pulse signal by a waveform converting circuit in the reproducing or playback apparatus, the pulse width of the reproduced signal will be different from that of the corresponding signal which was recorded, whereby the reproduced data will not be correctly demodulated or further processed and problems will result. In order to avoid such problems, it has been proposed to employ, as the waveform converting circuit, a comparator which receives the reproduced signal and compares the latter with a reference voltage or threshold level that is adjustable manually for correcting asymmetry. However, such manual adjustment of the threshold level is obviously troublesome.

In order to eliminate asymmetry without the need for manual adjustment of a threshold level, it has been suggested, for example, as described in detail in each of U.S. Pat. Nos. 4,397,011 and 4,418,406, and having a common assignee herewith, to vary the threshold level automatically in response to data included in the reproduced signal derived from the record disc. More particularly, a run length limited code modulation system is preferably used in recording a PCM audio signal as it permits the minimum transition interval $T_{min}$, that is, the minimum interval from one transition between the data "0" and "1" to the next transition between the data "0" and "1", to be extended or lengthened for enhancing the recording efficiency, and further in that it permits the maximum transition interval $T_{max}$ to be shortened for facilitating the self clocking of the playback or reproducing apparatus on the basis of data derived from the reproduced signal. Further, when the run length limited code modulating system is used, each frame of the recorded signal includes a frame synchronizing signal in the form of a bit pattern corresponding to two successive maximum transition intervals $T_{max}$ or two successive minimum transition intervals $T_{min}$. Since the normal modulation of the recorded signal does not result in maximum transition intervals $T_{max}$ or minimum transition interval $T_{min}$ occurring twice in succession, each frame synchronizing signal can be readily identified in the reproduced output. Moreover, in the event of asymmetry, opposite polarity portions of the output signal from the comparator acting as a waveform converting circuit, and which correspond to the two successive transition intervals constituting a frame synchronizing signal, become unequal in duration. In the arrangements shown in U.S. Pat. No. 4,397,011 and 4,418,406, such inequality is detected and gives rise to a change in the threshold level or reference voltage applied to the comparator in the sense to make equal the transition intervals constituting the frame synchronizing signal in the reproduced signal, whereby to compensate for, or correct the asymmetry.

Further, in U.S. Pat. No. 4,397,011, the transition interval of the reproduced frame synchronizing signal is compared with a reference value which corresponds to the desired constant linear velocity of the record disc so that any change in the transition interval of the reproduced frame synchronizing signal due to deviation of the linear velocity of the disc from the desired value is detected as a comparison output which can be used as a velocity servo control signal effective in a motor control circuit to restore the rotated record disc to the desired constant linear velocity.

It has also been disclosed in U.S. Pat. No. 4,397,011, to separate, from the output of the comparator acting as a waveform converting circuit for the reproduced signal, a clock component of the reproduced PCM signal, and to apply such clock component to a phase locked loop (PLL) circuit which produces a reproducing clock pulse of bit frequency having the same time-base fluctuations as the reproduced signal. Such reproduced clock pulse is phase compared with a suitable reference phase signal to produce a corresponding phase control signal by which a predetermined phase of the reproduced PCM signal can be maintained while the record disc is driven at the predetermined constant linear velocity. However, in the foregoing arrangement, the phase servo circuit is made operative only after the velocity servo circuit has been effective to establish the constant predetermined linear velocity of the record disc. The foregoing results from the fact that the PLL circuit of the phase servo circuit has a limited lock range. Thus, following any substantial change in the rotational or angular velocity of the record disc in consequence of a change in the radial position on the disc at which the transducer or pick-up scans the same, the rotation of the record disc can be phase-locked to the reference phase signal only after the velocity servo circuit has been effective to restore or capture the desired constant linear velocity.

Since the above described apparatus has its velocity servo circuit and phase servo circuit acting successively in two steps, only one of such servo circuits can act effectively at any time. Further, in such apparatus, the circuit for detecting the maximum or minimum transition interval for the velocity servo circuit and for the circuit for correcting asymmetry is duplicated and, as a result thereof, the circuits are undesirably complex and expensive.

OBJECTS AND SUMMARY OF THE INVENTION

Accordingly, it is an object of this invention to provide an apparatus for reproducing an audio or other information signal recorded on a record medium, and which avoids the foregoing problems.

More specifically, it is an object of this invention to provide an improved servo system for controlling the rotation of a record disc in an apparatus for reproducing an audio or other information signal recorded on the record disc as a pulse code modulation in a run length limited code.

Another object of this invention is to provide an apparatus, as aforesaid, with a servo system including a velocity servo circuit and a phase servo circuit, and in which an output of the velocity servo circuit for establishing a constant linear velocity of the record disc in a stable state is composed with an output of the phase servo circuit for jointly controlling a motor by which the record disc is rotated.

Still another object of this invention is to provide an apparatus, as aforesaid, in which a single detecting circuit for detecting a maximum or minimum transition interval is made part of a velocity servo circuit and also of a control circuit for correcting asymmetry so that the circuit arrangement can be relatively simplified.

A further object of this invention is to provide an apparatus, as aforesaid, with a servo circuit which is suitable to be digitally constructed.

In accordance with an aspect of this invention, in an apparatus for reproducing from a record medium, a recorded PCM signal in a run length limited code, there are provided a pick-up or transducer means for deriving a reproduced signal from the record medium as the latter is driven, means for comparing the reproduced signal with a first reference signal so as to produce an output signal corresponding to the reproduced signal and having successive portions of opposite polarities, a detecting circuit for detecting a transition interval between transitions from one to the other of said opposite polarity portions of the output signal and for producing a corresponding detected signal, a velocity servo circuit including means comparing the detecting signal with a second reference signal which corresponds to a predetermined limit, for example, a maximum or minimum, of said transition interval when the record medium is driven at a predetermined velocity and producing a corresponding velocity control signal for maintaining the record medium at the predetermined velocity, the velocity servo circuit further including a first time constant circuit for determining the rate of response of the velocity servo circuit to any deviation from said predetermined velocity, and a phase servo circuit in which a reproduced phase signal produced by a phase locked loop from the reproduced signal is compared with a reference phase signal to provide a corresponding phase control signal for maintaining a predetermined phase of the reproduced signal when the record medium is driven at said predetermined velocity, the phase servo circuit including a second time constant circuit for determining the rate of response of the phase servo circuit to any deviation from said predetermined phase and having a time constant smaller than that of the first time constant circuit so that the velocity control signal and the phase control signal can be composed to simultaneously influence the drive of the record medium.

It is a further feature of this invention to provide the aforesaid apparatus with a reference control circuit for establishing a level of the first reference signal such that opposite polarity portions of the output signal constituting a frame synchronizing signal have respective intervals which are equal to each other, whereby to correct for asymmetry. In such case, means are provided for alternately supplying the opposite polarity portions of the output signal to the detecting circuit and correspondingly alternately applying the detected signal to the velocity servo circuit and to the reference control circuit, respectively, whereby the apparatus employs a single detecting circuit for both the velocity servo control and the correction of asymmetry.

The above, and other objects, features and advantages of this invention, will be apparent in the following detailed description of an illustrative embodiment thereof when read in conjunction with the accompanying drawings in which corresponding components and parts are identified by the same reference numerals in the several views.

DESCRIPTION OF THE PREFERRED EMBODIMENT

In order to facilitate understanding of the problems overcome by the present invention, reference will first be made to FIG. 1 in which there is illustrated an optical-type reproducing or playback apparatus for reproducing from a record disc, a PCM audio signal recorded in a run length limited code, which apparatus has a servo system generally of the kind disclosed in U.S. Pat. No. 4,397,011. In such apparatus, a transducer in the form of a photo-detector 1 is part of a pick-up scanning a track on a rotated record disc in which a PCM audio signal is recorded and responds to a transmitted or reflected laser beam modulated with the recorded signal to provide a reproduced PCM signal which is supplied to a reproducing amplifier 2 from which a reproduced signal $S_P$ is derived. Reproduced signal $S_P$ has a blunted wave form so as to be similar to a sine wave and is supplied to a comparator 3 acting as a waveform converter and in which reproduced signal $S_P$ is compared with a threshold voltage $V_T$ to provide a resulting output signal $S_O$ delivered to an output terminal 18 and comprised of successive portions of opposite polarities which generally correspond to the "1" and "0" levels of the original recorded signal.

Figure 1:
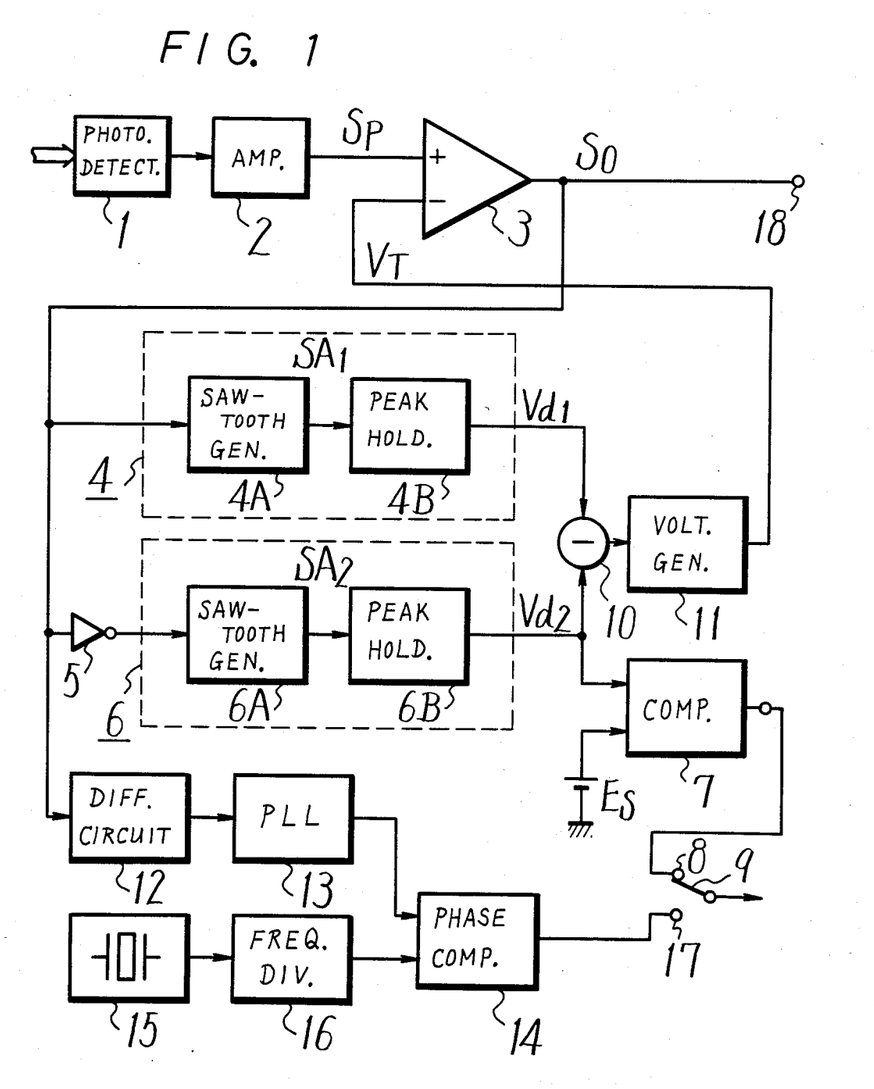
FIG. 1 is a block diagram of an apparatus for reproducing a signal recorded on a record medium and having an earlier proposed servo circuit for controlling the velocity at which the record medium is driven.

In the servo system of FIG. 1, output signal $S_O$ from comparator 3 is also supplied directly to a first detecting circuit 4 and, through an inverter 5, to a second detecting circuit 6. The detecting circuits 4 and 6 are provided for detecting the maximum transition interval $T_{max}$ of the positive and negative polarity portions of output signal $S_O$, and are respectively comprised of sawtooth waveform generating circuit 4A and a peak value hold circuit 4B, and of a saw-tooth waveform generating circuit 6A and a peak value hold circuit 6B. Saw-tooth waveform generating circuit 4A produces a saw-tooth wave $SA_1$ (FIG. 2C), which is a signal having its level gradually increased at a constant rate during each period in which output signal $S_O$ (FIG. 2A) from comparator 3 is of positive polarity or indicative of the data "1". Saw-tooth waveform generator 6A produces a saw-tooth wave $SA_2$ (FIG. 2D) which is a signal whose level gradually increases at the same rate as the saw-tooth wave $SA_1$, but during each period in which output signal $S_O$ is of negative polarity or indicative of the data "0", that is, during each period in which the inverted output signal $\bar{S}_O$ (FIG. 2B) from inverter 5 is of positive polarity. The peak value hold circuits 4B and 6B are provided to hold the peak value levels $Vd_1$ and $Vd_2$ attained by saw-tooth waves $SA_1$ and $SA_2$, respectively.

Such held or retained peak value levels $Vd_1$ and $Vd_2$ are provided as the detected signals or outputs from the first and second detecting circuits 4 and 6, and are levels corresponding to the maximum transition intervals $T_{max}$ of the positive and negative polarity portions of reproduced signal $S_O$. Therefore, if the standard length of a bit cell of the recorded PCM audio signal is referred to as T, and the level of output or detected signal $Vd_1$ or $Vd_2$ from detecting circuit 4 or 6 when the respective maximum transition interval is 5.5 T is employed as a velocity reference voltage or level $E_S$, then deviation of the actual detected signal $Vd_1$ or $Vd_2$ from the velocity reference voltage $E_S$ is an indication of the deviation of the linear velocity of the record disc at the location where the latter is being scanned by the pick-up during reproducing from the desired constant linear velocity, that is, the linear velocity at such location on the record disc during recording. In the servo system shown on FIG. 1, output or detecting signal $Vd_2$ from detecting circuit 6 and velocity reference voltage $E_S$ are applied to respective inputs of a level comparator 7 which provides a corresponding output or velocity control signal to a fixed contact 8 of a switch 9. Such velocity control signal, when applied through switch 9 to a conventional motor control circuit for the motor (not shown) driving the record disc, is effective to increase the rotational speed of the motor when output $Vd_2$ of detecting circuit 6 indicates a maximum transition interval $T_{max}$ longer than 5.5 T, and to decrease the rotational speed of the motor, and hence of the record disc, when output $Vd_2$ corresponds to a detected maximum transition interval $T_{max}$ shorter than 5.5 T.

The output or detected signals $Vd_1$ and $Vd_2$ from detecting circuits 4 and 6 are also supplied to respective inputs of a subtracting circuit 10 which, in response to any difference between such signals $Vd_1$ and $Vd_2$, provides a corresponding difference output to a voltage generator 11, for example, in the form of an amplifier. The resulting output from voltage generator 11 is applied to comparator 3 as the threshold voltage or level $V_T$.

The operation of the above described portion of the servo system shown on FIG. 1 will now be described for that period during which a frame synchronizing signal of the reproduced signal $S_P$ is being applied to comparator 3. In this case, each frame synchronizing signal is assumed to have been recorded so as to appear, in output signal $S_O$, as two successive 5.5 T intervals of opposite polarities. If asymmetry does not occur, for example, as shown by the solid lines on FIGS. 2A and 2B, the intervals of the negative and positive portions of the frame synchronizing signal included in output signal $S_O$ derived from comparator 3 and in inverted output signal $\bar{S}_O$ are equal to each other, that is, are each precisely equal to 5.5 T. Thus, the peak value $Vd_1$ of sawtooth wave $SA_1$ and the peak value $Vd_2$ of saw-tooth wave $SA_2$ are equal to each other so that the error signal or output from subtractor 10 becomes zero and, in response thereto, the reference or threshold voltage $V_T$ from generator 11 is at a predetermined level.

Figure 2A:
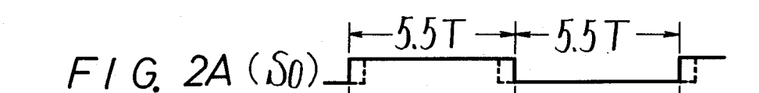
FIGS. 2A-2D are waveform diagrams to which reference will be made in explaining the operation of the apparatus shown on FIG. 1.
Figures 2B, 2C:
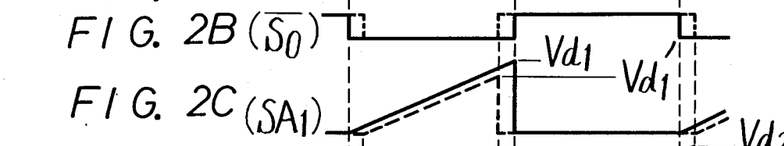
Figure 2D:
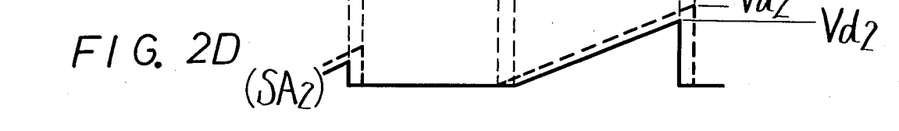

Upon the occurrence of asymmetry, so that, for example, the positive portion of the frame synchronizing signal in output signal $S_O$ has its length of interval decreased while the negative portion of such frame synchronizing signal has its interval or length increased, as shown in broken lines on FIG. 2A, while the lengths of the negative and positive portions of the frame synchronizing signal of inverted output signal $\bar{S}_O$ are similarly decreased and increased, respectively, as shown in FIG. 2B, then the peak value of saw-tooth wave $SA_1$ is decreased, for example, as indicated in broken lines at $Vd_1'$ on FIG. 2C, and the peak value of saw-tooth wave $SA_2$ is increased, as indicated in broken lines at $Vd_2'$ on FIG. 2D. Thus, in response to the described asymmetry, subtractor 10 provides an error signal corresponding to $Vd_1' - Vd_2' = -\Delta V$. Such error signal $-\Delta V$ causes generator 11 to lower the level of threshold voltage $V_T$ generated thereby to an extent sufficient to again achieve $\Delta V = 0$ by equalizing the lengths or intervals of the positive and negative portions of the frame synchronizing signals in output signal $S_O$. If the asymmetry is such as to cause relative changes in the intervals of the opposite polarity portions of each frame synchronizing signal which are opposite to those shown in broken lines on FIGS. 2A and 2B, so that, for example, the positive polarity portion of a frame synchronizing signal in output signal $S_O$ has its interval increased beyond 5.5 T and the negative polarity portion of the corresponding frame synchronizing signal in inverted output signal $\bar{S}_O$ has its interval similarly increased, then the polarity of the error signal from subtractor 10 becomes positive and generator 11 is controlled thereby to suitably raise the level of reference or threshold voltage $V_T$. In either case, fluctuation of the pulse width in output signal $S_O$ due to asymmetry is eliminated.

Since the frame synchronizing signal is distinguished from the recorded information signal or data by the existence, in the frame synchronizing signal, of an inverting or transition interval beyond the maximum transition interval (for example, 5.5 T in the previously mentioned example) of its modulation system, it is sufficient merely to detect the transition interval of the frame synchronizing signal and to hold such detected transition interval. In other words, of the various transition intervals in the reproduced signal $S_O$, either the maximum transition interval or the minimum transition interval is detected and then held, and the speed of rotation of the record disc is correspondingly adjusted to maintain a constant linear velocity of the record disc at the location where the latter is being scanned.

Further, in the servo system of FIG. 1, the output signal $S_O$ of comparator 3 is supplied to a differential circuit 12 in which a clock component of the reproduced PCM signal is extracted from signal S and applied to a phase locked loop (PLL) circuit 13. The PLL circuit 13 responds to such clock component from differential circuit 12 to provide, at the output of PLL circuit 13, a reproducing clock of bit frequency having the same timebase fluctuations as reproduced signal $S_O$. Such reproducing clock is applied to one input of a phase comparator 14 which, at its other input, receives a reference phase signal from a crystal oscillator 15 by way of a frequency divider 16. Thus, comparator 14 compares the phase of the reproducing clock from PLL circuit 13 with the reference phase signal, and the resulting comparison output is applied to a second fixed contact 17 of switch 9. Thus, when switch 9 is changed-over from the position shown on FIG. 1 to engage its movable contact with fixed contact 17, the comparison output of comparator 14, which constitutes a phase control signal, is applied to the control circuit for the motor driving the record disc so as to remove any phase variation in the rotation of the record disc at the constant linear velocity, thereby to substantially remove wow and flutter from the reproduced signal $S_O$.

It will be noted that, in the servo system shown on FIG. 1, the phase servo circuit (constituted by the components identified by the reference numerals 12-16) is not initially operative, but is made operative only after the velocity servo circuit (constituted by the components identified by the reference numerals 5, 6 and 7) has been effective to establish the desired constant linear velocity of the record disc, whereupon switch 9 is changed-over from the position shown on FIG. 1 to a position in which its movable contact engages fixed contact 17 for permitting the phase servo circuit to become operative. The foregoing is necessary by reason of the fact that PLL circuit 13 of the phase servo circuit has a limited lock range from which it follows that, in the event of a substantial change in the linear velocity of the record disc, for example, due to a change in the scanning position of the pick-up, the rotation of the record disc can be phase-locked to the output of oscillator 15 only after the rotational speed of the record disc has been adjusted by the velocity servo circuit so as to return the linear velocity at the scanned location to the desired constant value. When switch 9 is changed-over to render operative the phase servo circuit, the velocity servo circuit is made inoperative.

It will be appreciated from the above that, in the servo system shown on FIG. 1, since the velocity and phase servo circuits are only operative alternately, or in two steps, to control the rotation of the record disc, such control is not smoothly effective, and a relatively large number of parts are required. Further, in the servo system of FIG. 1, two detecting circuits 4 and 6 are provided for detecting the maximum or minimum transition intervals for the velocity servo circuit and for the control circuit correcting asymmetry whereby the complexity and cost of the servo system are relatively increased.

Figure 3:
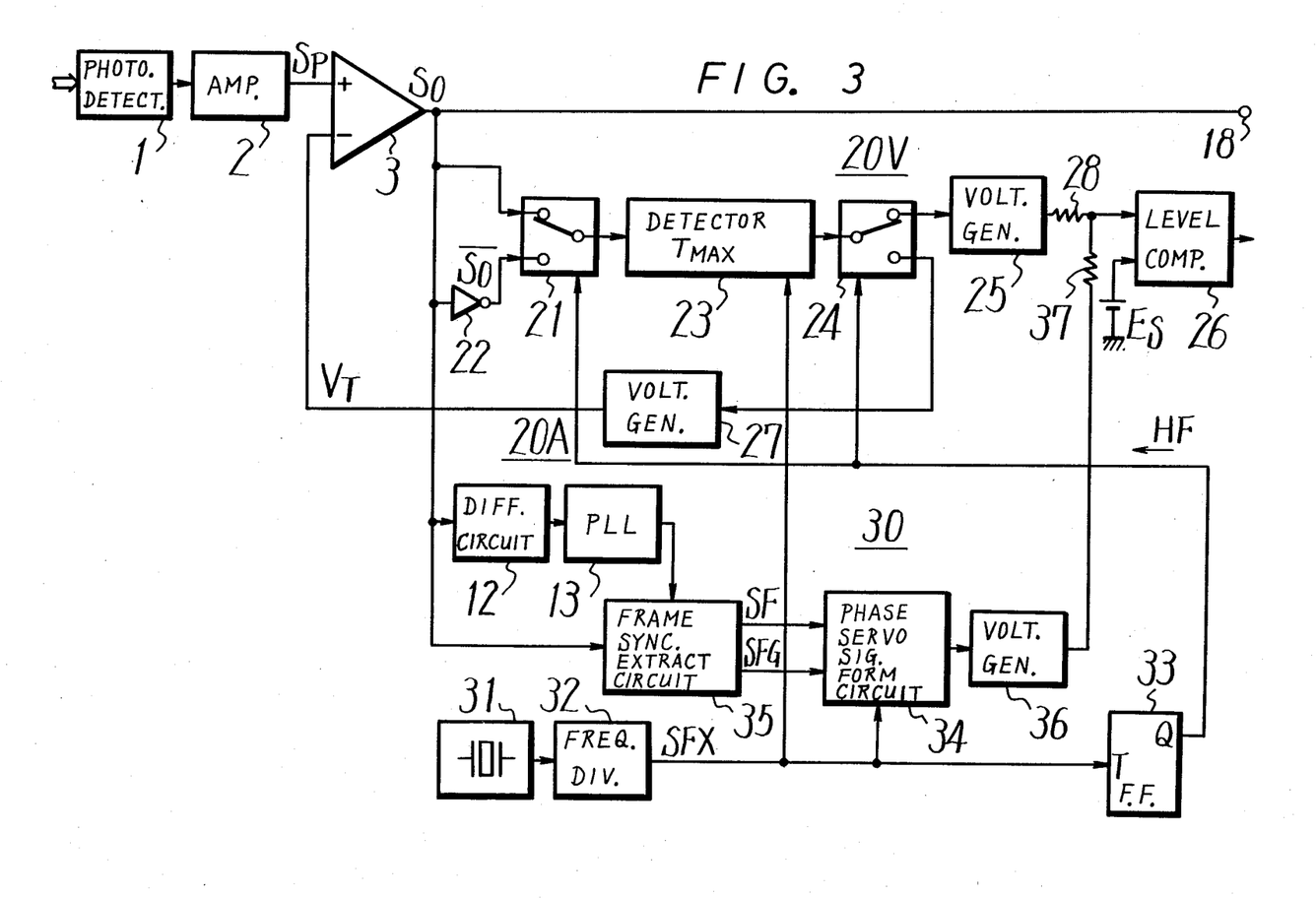
FIG. 3 is a block diagram showing an apparatus for reproducing a signal recorded on a record medium and which has a servo system according to one embodiment of the present invention.

Referring now to FIG. 3, it will be seen that, in the reproducing apparatus according to the embodiment of the present invention there illustrated, a photo-detector 1 of a pick-up scanning a track on a rotated record disc in which a PCM audio signal is recorded again responds to a transmitted or reflected laser beam modulated with the recorded signal to provide a reproduced PCM signal $S_P$ which is supplied through a reproducing amplifier 2 to a comparator 3 acting as a waveform converter, and in which reproduced signal $S_P$ is compared with a threshold voltage $V_T$ to provide the output signal $S_O$ comprised of successive portions of opposite polarities and being delivered to output terminal 18. Further, in the embodiment of FIG. 3, output signal $S_O$ is supplied directly to one input of a switching circuit 21 and through an inverter 22 to another input of switching circuit 21. The output of switching circuit 21 is shown to be applied to a detecting circuit 23 for detecting the maximum transition interval and which, similarly to the detecting circuit 4 or 6 of FIG. 1, may be comprised of a saw-tooth waveform generating circuit and a peak value hold circuit. The detected output from detecting circuit 23 is supplied to an input of a switching circuit 24 for application alternately through one output to a voltage generator 25, or through another output of switching circuit 24 to a voltage generator 27. The output of voltage generator 25, which may be in the form of an amplifier, is supplied, for example, through a resistor 28, to one input of a level comparator 26 which, at its other input, receives the reference voltage $E_S$ so that the resulting comparison output of comparator 26 may constitute the velocity control signal applicable to a motor control circuit for maintaining the record disc at a constant linear velocity at the location where the same is being scanned. When switching circuit 24 is changed over from the condition shown on FIG. 3, the detecting signal or output from detecting circuit 23 causes voltage generator 27 to suitably determine the threshold voltage $V_T$ to comparator 3.

Figure 4A:
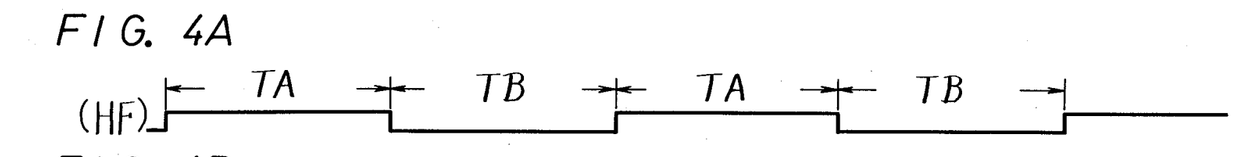
FIGS. 4A-4C are waveform diagrams to which reference will be made in explaining the operation of the apparatus shown on FIG. 3.

For operating switching circuits 21 and 24, the servo system shown on FIG. 3 further includes a crystal oscillator 31 providing an oscillation output to a frequency divider 32 which forms an output pulse signal SFX (FIG. 6A) having a period corresponding to that of each recorded frame. The pulse signal SFX is applied to a flip-flop 33 which produces a switch control signal HF (FIG. 4A) having its polarity inverted at each frame period. The signal HF is applied, as a switching signal, to switching circuits 21 and 24. Thus, during each frame period TA in which the signal HF (FIG. 4A) is "1", switches 21 and 24 are in the conditions illustrated on FIG. 3 so that output signal $S_O$ is applied through switching circuit 21 to detecting circuit 23, and the resulting detected output of circuit 23 is supplied through switching circuit 24 to voltage generator 25. On the other hand, during each frame period TB in which signal HF is "0", switching circuits 21 and 24 are changed over from the conditions shown on FIG. 3 so that the inverted output signal $\overline{S}_O$ from inverter 22 is applied through switching circuit 21 to detecting circuit 23 and the resulting detected output of the latter is supplied through switching circuit 24 to voltage generator 27. Further, the pulse signal SFX derived from frequency divider 32 is applied to the maximum transition interval detecting circuit 23 so as to reset the latter substantially in synchronism with each change-over of switching circuits 21 and 24 at the commencement of each frame period.

Figure 4B:
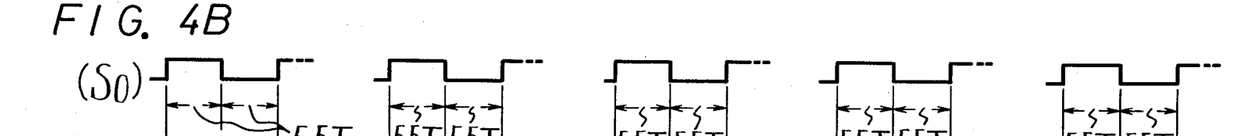
Figure 4C:
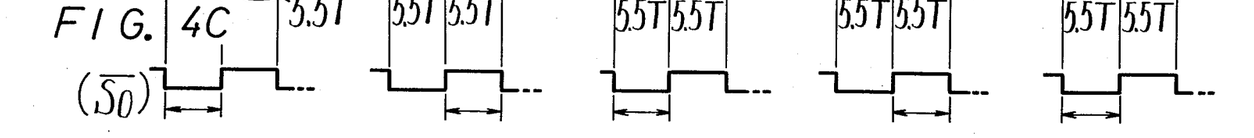

In the servo system according to this invention so far described with reference to FIG. 3, a velocity servo circuit 20V is constituted by comparator 3, detecting circuit 23, voltage generator 25 and level comparator 26 when switching circuits 21 and 24 are in the conditions shown on FIG. 3. On the other hand, when switching circuits 21 and 24 are changed-over from the conditions shown on FIG. 3, an asymmetry correction circuit 20A is constituted by the closed loop comprising comparator 3, inverter 22, detecting circuit 23, and voltage generator 27. The operations of such velocity servo circuit 20V and asymmetry correction circuit 20A will now be described with reference to the reproducing of a frame synchronizing signal included in the recorded signal. During the reproducing of the frame synchronizing signal, the output signal S and the inverted output signal $\overline{S}_O$ applied to respective inputs of switching circuit 21 have the waveforms shown on FIGS. 4B and 4C, respectively. During each of the alternate frame periods TA in which switching signal is "1" switching circuits 21 and 24 are in the conditions indicated on FIG. 3 for enabling the operation of velocity servo circuit 20V. Thus, detecting circuit 23 detects the maximum transition interval of the positive polarity portions of output signal $S_O$ which, of course, occurs in the frame synchronizing signal at the commencement of the frame period TA. The resulting detected output is applied through switching circuit 24 to voltage generator 25 and the output of the latter is applied through resistor 28 to level comparator 26. In the event that the detected output of detecting circuit 23 corresponds to a detected maximum transition interval deviating from the nominal value of 5.5 T (FIG. 4B), then the corresponding voltage from generator 25 through resistor 28 to comparator 26 causes the velocity control signal from the latter to vary the rotational speed of the record disc in the sense for restoring the desired constant linear velocity at the scanned location on the disc.

On the other hand, in each frame period TB in which switching signal HF is "0", switching circuits 21 and 24 are changed-over to the conditions opposite to those illustrated on FIG. 3 and, as a result thereof, asymmetry correction circuit 20A is made active. In such case, detecting circuit 23 detects the maximum transition interval of the positive polarity portion of the frame synchronizing signal in the inverted signal $\overline{S}_O$ which, of course, correponds to the maximum transition interval of the negative polarity portion of the frame synchronizing signal in the output signal $S_O$. The corresponding detected output from detecting circuit 23 is supplied through switching circuit 24 to voltage generator 27 which correspondingly adjusts the level of threshold voltage $V_T$ in the sense for restoring the detecting maximum transition interval to 5.5 T, whereby to eliminate or correct for any asymmetry in the reproduced signal $S_O$.

In other words, velocity servo circuit 20V acts to ensure that the maximum transition interval $T_{max}$ for the positive polarity portions of output signal $S_O$ will be maintained at 5.5 T, while asymmetry correction circuit 20A acts to ensure that the maximum transition interval $T_{max}$ for the negative polarity portions of output signal $S_O$ will be similarly maintained at 5.5 T. Thus, velocity servo circuit 20V and asymmetry correcting circuit 20A operate in a time-sharing manner to ensure that the linear velocity at the location where the record disc is being scanned, will be maintained at the predetermined value at which the maximum transition interval $T_{max}$ is 5.5 T, and further to ensure that the maximum transition intervals for the portions of opposite polarity are made equal to each other for eliminating or correcting any asymmetry.

The servo system according to this invention is further shown on FIG. 3 to include a phase servo circuit 30 for controlling the rotational phase of the record disc and thereby eliminating wow and flutter, with the velocity servo circuit 20V having a time constant which is substantially larger than that of phase servo circuit 30 so that, after the desired linear velocity has been established, the respective velocity control signal and phase control signal can be composed or added to each other for controlling the motor drive circuit.

More specifically, in the embodiment of the invention shown on FIG. 3, phase servo circuit 30 is shown to be generally comprised of a phase servo signal forming circuit 34, a frame synchronizing signal extracting circuit 35, a voltage generator 36, and a resistor 37 through which an output voltage from generator 36 is added to the output voltage applied through resistor 28 to level comparator 26 from voltage generator 25. In addition to the foregoing, phase servo circuit 30 includes a differential circuit 12 and a PLL circuit 13 by which reproduced clock pulses having the same time-base fluctuations as the reproduced signal $S_O$ are supplied to frame synchronizing signal extracting circuit 35 which, as shown, also receives output signal $S_O$ from comparator 3. Frame synchronizing signal extracting circuit 35 is operative, for example, to count clock pulses of constant period during each of the successive portions of opposite or inverted polarity in output signal $S_O$ so as to detect the frame synchronizing signal SF. In other words, a frame synchronizing signal SF is extracted or provided by circuit 35 whenever the counting of the constant period clock pulses by circuit 35 indicates that the desired maximum transition interval $T_{max}$, for example, of 5.5 T, has occurred twice in sequence. Of course, when the record disc is driven at a linear velocity other than the desired constant value, as during acceleration of the record disc when operation of the reproducing apparatus is commenced, the number of clock pulses counted within any two successive positive and negative polarity portions of output signal $S_O$ will not correspond to the number of clock pulses occurring in such portions of a frame synchronizing signal which, therefore, will not be detected or extracted by circuit 35. Further, even when a frame synchronizing signal SF does not occur by reason of dropout or the like, the reproduced clock pulses from PLL circuit 13 are frequency-divided in frame synchronizing signal extracting circuit 35 to provide a signal SFG which is synchronized with the dropped signal SF and can likewise indicate the frame period.

The phase servo signal forming circuit 34 is supplied with the extracted frame synchronizing signal SF, the frame period indicating signal SFG and the reference signal SFX derived from frequency divider 32 and having the frame period. Phase servo signal forming circuit 34 only forms a phase servo signal when the frame synchronizing signal SF is extracted by frame synchronizing signal extracting circuit SF. When the frame synchronizing signal 35 is extracted stably from output signal $S_O$ by circuit 35, phase servo signal forming circuit 34 phase compares signal SFG with reference signal SFX to provide a comparison output signal indicative of the phase deviation therebetween. Such comparison output is supplied to voltage generator 36 which produces a corresponding output voltage or phase control signal added, by way of resistor 37, to the output voltage from generator 25 in velocity servo circuit 20V. Resistors 28 and 37 serve to suitably mix or add the output voltages from generators 25 and 36, and the resultant thereof is applied to level comparator 26.

It will be seen that phase servo circuit 30 is inoperative until velocity servo circuit 20V causes the linear velocity of the record disc at the scanned location to attain the predetermined or desired constant value because PLL circuit 13 has a narrow locking range. In other words, until the linear velocity at the scanned location on the record disc attains the desired value, the frame synchronizing signal SF indicating that the maximum transition interval $T_{max}$ of 5.5 T has occurred twice in sequence, is not extracted by circuit 35. Accordingly, in the absence of frame synchronizing signal SF, circuit 34 does not form the phase servo signal with the result that phase servo circuit 30 is inoperative. On the other hand, when the linear velocity at the scanned location attains the predetermined or desired value, frame synchronizing signal SF is extracted in a stable manner so that the phase servo signal is formed by circuit 34 and the motor driving the record disc is controlled by phase servo circuit 30. Therefore, the drive motor for the record disc is controlled by velocity servo circuit 20V and phase servo circuit 30 when in the steady state, with the velocity servo circuit 20V being active for large fluctuations from the desired constant linear velocity, while phase servo circuit 30 is active to correct for small fluctuations.

Figure 5:
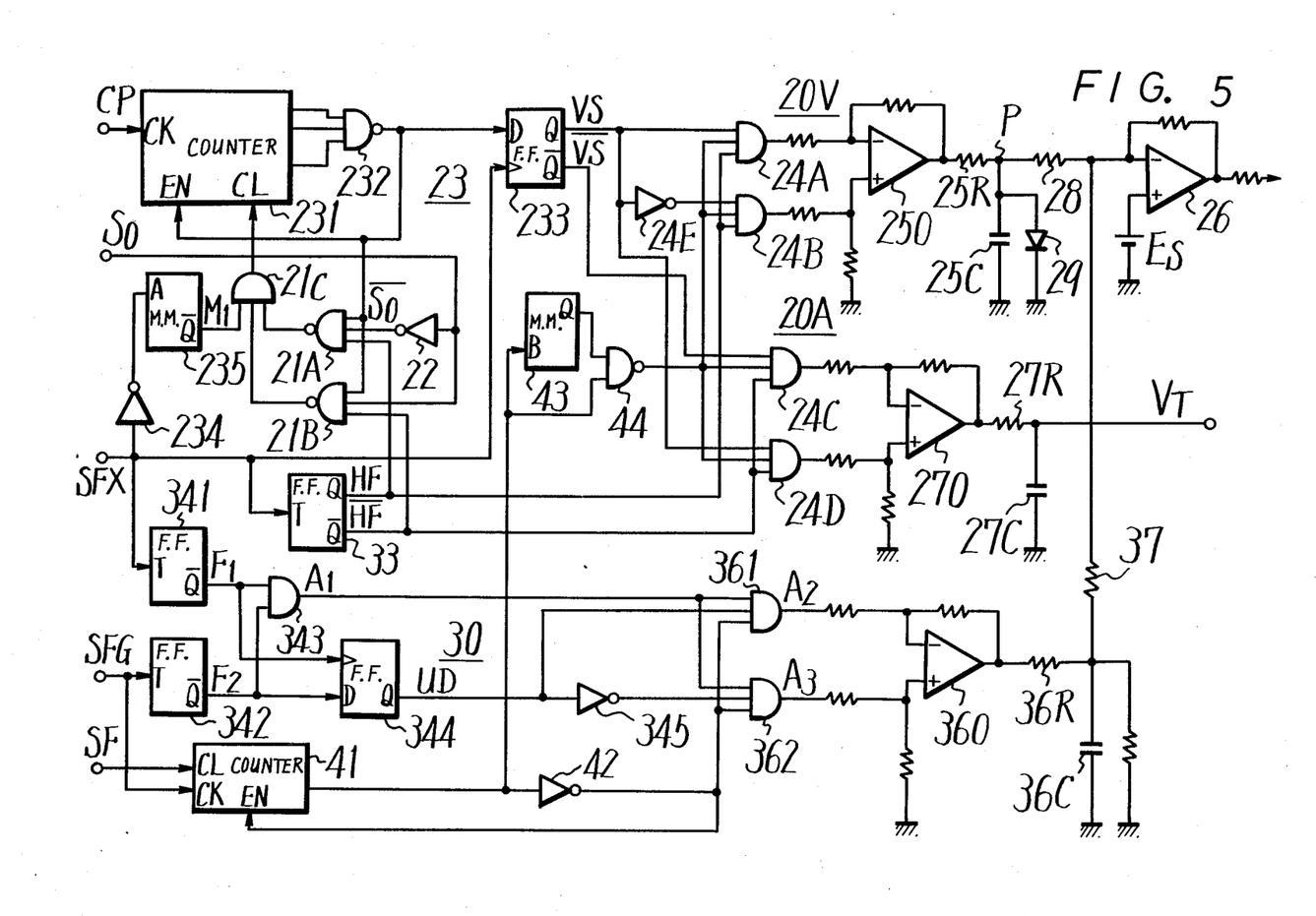
FIG. 5 is a circuit diagram showing details of essential components in a practical example of the apparatus shown on FIG. 3.

Referring now to FIG. 5, it will be seen that, in a practical circuit arrangement of a servo system according to the embodiment of the invention generally illustrated on FIG. 3, the detecting circuit 23 for determining whether or not the maximum transition interval $T_{max}$ of the reproduced signal $S_O$ attains the value 5.5 T is effective to count, in each of the successive, oppositely polarized portions of output signal $S_O$, a clock pulse of a constant frequency substantially higher than the bit frequency of reproduced signal $S_P$. More particularly, in FIG. 5, detecting circuit 23 is shown to include a counter 231 having a clock terminal CK which receives clock pulses CP with a constant frequency of, for example, about 34.6 MHz. NAND gates 21A and 21B are provided to function as switching circuit 21 of FIG. 3, and output signal $S_O$ from comparator 3 is supplied directly to NAND gate 21B and, through inverter 22, as an inverted output signal $\overline{S_O}$ to NAND gate 21A. The Q output or switching signal HF from flip-flop circuit 33 is supplied to NAND gate 21A, and an inverted or $\overline{Q}$ output $\overline{HF}$ of flip-flop 33 is applied to NAND gate 21B. Outputs of NAND gates 21A and 21B are connected to respective inputs of an AND gate 21C which has its output connected to a clear terminal CL of counter 231. Counter 231 is cleared when the output of AND gate 21C applied to terminal CL goes from "1" to "0", or when terminal CL otherwise receives a negative pulse. Counter 231 also has an enable terminal EN and is operative to count the clock pulses CP so long as a "1" signal is applied to terminal EN from the output of a NAND gate 232 which receives a plurality of outputs from counter 231.

If, at any time, the number of clock pulses CP counted by counter 231 during either a positive polarity portion or a negative polarity portion of signal $S_O$, exceeds, even by one clock pulse, the number of such clock pulses CP occurring within the established period 5.5 T, then all of the outputs of counter 231 become "1" with the result that the output of NAND gate 232 changes-over from its normal value "1" to "0". Such "0" output of NAND gate 232, when applied to enable terminal EN of counter 231, prevents further counting operation of the latter. Moreover, as shown, the output of NAND gate 232 is also applied to inputs of NAND gates 21A and 21B.

A D flip-flop circuit 233 has a D input receiving the output of NAND gate 232 and, in response to the frame period reference signal SFX (FIG. 6A) derived from frequency divider 32 in FIG. 3 at the commencement of each frame period, flip-flop circuit 233 memorizes the then existing state or output of NAND gate 232. The frame period reference signal SFX is also shown to be applied through an inverter 234 to a trigger terminal A of a monostable multivibrator (MM) 235 having an inverted output $\overline{Q}$ at which a negative polarity pulse $M_1$ is provided slightly after the rise of signal SFX, that is, after the output of NAND gate 232 has been latched by D flip-flop 233. Output $\overline{Q}$ of monostable multivibrator 235, which is normally "1" and becomes "0" upon pulse $M_1$, is applied to an input of AND gate 21C. Thus, the output of AND gate 21C is effective to clear counter 231 whenever the output of NAND gate 21A or NAND gate 21B or the $\overline{Q}$ output of monostable multivibrator 235 goes from "1" to "0".

It will be seen that, in each frame period TA in which the Q output or switching signal HF from flip-flop 33 is "1", and so long as the output of NAND gate 232 is also "1", NAND gate 21A provides an output which is the inverse of signal $\overline{S}_O$, that is, a signal equivalent to output signal $S_O$, and the output of NAND gate 21B is continuously "1". Therefore, prior to the triggering of MM 235 to change its output momentarily from "1" to "0", the output of AND gate 21C applied to clear terminal CL of counter 231 is equivalent to output signal $S_O$. By reason of such output applied to clear terminal CL, in each frame period TA, counter 231 counts clock pulses CP in each positive polarity portion of output signal $S_O$, that is, when the latter is "1", and at the end of such positive polarity portion of signal $S_O$, counter 231 is cleared and, thereafter, in the subsequent negative polarity portion of $S_O$, that is, when the latter is "0", the counted output of counter 231 remains at zero. Similarly, during each frame period TB in which the signal $\overline{HF}$ from flip-flop 33 is "1", and so long as the output of NAND gate 232 is "1", NAND gate 21B provides an output signal which is an inversion of the signal $S_O$ and the output of NAND gate 21A is continuously "1". Therefore, prior to the triggering of MM 235, the output of AND gate 21C applied to clear terminal CL of counter 231 is equivalent to the inverted output signal $\overline{S}_O$. Thus, during each frame period TB, counter 231 counts clock pulses CP in each negative polarity portion of signal $S_O$, that is, when the latter is "0", and at the end of such negative polarity portion of signal $S_O$, counter 231 is cleared to remain at zero during the subsequent positive polarity portion of signal $S_O$, that is, when the latter is "1". Thus, so long as counter 231 is enabled by a "1" output from NAND gate 232, counter 231 counts the number of clock pulses CP occurring in each period or portion of output signal $S_O$ in which the latter is "1" during each of the alternately occurring or odd numbered frame periods $T_A$, whereas counter 231 counts the number of clock pulses CP occurring in each period or portion of signal $S_O$ in which the latter is "0" during each of the other or odd numbered frame periods TB.

It will be apparent from the foregoing that the D flip-flop circuit 233, at the commencement of each frame period TA or TB, stores the output of NAND gate 232 existing at the end of the preceding frame period TB or TA, respectively. Such stored or memorized output of NAND gate 232 is "1" if, at no time during the preceding frame period, any of the portions of opposite polarity in output signal $S_O$ was detected by counter 231 to have an interval longer than 5.5 T. However, if counter 231 detects any of the opposite polarity portions of signal $S_O$ to have an interval greater than 5.5 T, then the output of NAND gate 232 is changed over to "0" and retained at such level for the remainder of the respective frame period so as to be stored or memorized in D flip-flop circuit 233. More particularly, the output "0" from NAND gate 232 is effective, in each of NAND gates 21A and 21B to maintain the outputs of the latter continuously at the "1" level. Further, the output "0" from NAND gate 232 is effective, at enable terminal EN of counter 231 to prevent further counting operation of the latter. Therefore, if at any time in a frame period TA or TB the output of NAND gate 232 is changed-over to "0", such state of NAND gate 232 is maintained for the remainder of the respective frame period, that is, until MM 235 is triggered by frame period reference signal SFX to produce the negative output pulse $M_1$. Such output pulse $M_1$ is supplied through AND gate 21C to clear terminal CL of counter 231 so that the latter is cleared at the down-going side of output pulse $M_1$ after the output of NAND gate 232 has been latched by D flip-flop circuit 233. Since such clearing of counter 231 by negative output pulse $M_1$ causes the output of NAND gate 232 to return to "1", the application of the "1" output to enable terminal EN of counter 231 conditions the latter to again count the clock pulses CP during each positive polarity portion of output signal $S_O$ in each frame period TA, or during each negative polarity portion of output signal $S_O$ in each frame period TB. Again, at the conclusion of each positive or negative portion of output signal $S_O$ in which counter 231 has been counting clock pulses CP, counter 231 is cleared by a "0" output from NAND gate 21A or 21B by way of AND gate 21C.

Continuing with the circuit arrangement shown on FIG. 5, it will be seen that AND gates 24A and 24B there correspond to one of the outputs of switching circuit 24 in FIG. 3, while AND gates 24C and 24D correspond to the other output of switching circuit 24. A Q output VS of D flip-flop circuit 233 is applied directly to inputs of AND gates 24A and 24D, and also through an inverter 24E to an input of AND gate 24B. An inverted or $\overline{Q}$ output $\overline{VS}$ of D flip-flop circuit 233 is applied to an input of AND gate 24C. Further, the Q output HF of flip-flop circuit 33 is applied to respective inputs of AND gates 24A and 24B, while the $\overline{Q}$ or inverted output $\overline{HF}$ of flip-flop circuit 33 is applied to inputs of AND gates 24C and 24D. Thus, AND gates 24A and 24B are enabled to open by switching signal HF in each frame period TA, while AND gates 24C and 24D are enabled to open by inverted switching signal $\overline{HF}$ in each frame period TB. The outputs of AND gates 24A and 24B are connected to inverting and non-inverting input terminals, respectively, of an operational amplifier 250 which has its output connected through a resistor 25R and a capacitor 25C, in series, to ground for constituting therewith the voltage generator 25 of FIG. 3.

During each frame period TA in which the Q output VS of D flip-flop 233 indicates a stored or memorized output "0" of NAND gate 232, operational amplifier 250 supplies a constant current through resistor 25R to capacitor 25C. On the other hand, during each frame period TA in which the Q output VS of D flip-flop 233 indicates that the stored output of NAND gate 232 is "1", a discharge current flows from capacitor 25C through resistor 25R. The time constant determined by capacitor 25C and resistor 25R is selected so that it is substantially larger than one frame period, whereby the voltage constituting the output VS of D flip-flop 233 is converted to a voltage across capacitor 25C. Further, a diode 29 is connected in parallel with capacitor 25C to ground so as to ensure that a positive voltage cannot be developed at a junction point P between resistor 25R and capacitor 25C. The resulting more or less negative voltage at point P is applied through resistor 28 to the inverting input terminal of an operational amplifier which functions as the level comparator 26 of FIG. 3, and the reference voltage $E_S$ is applied to the non-inverting input terminal of such operational amplifier 26. The output of operational amplifier 26 constitutes a velocity control signal which can be applied to a motor control circuit (not shown) for maintaining a predetermined constant linear velocity of the record disc at the location where it is scanned by the pick-up.

When a record disc is initially loaded in the reproducing apparatus, output VS from D flip-flop circuit 233 is "0" so that the voltages at the opposite sides of capacitor 25C are made zero by the operation of diode 29. As a result of the foregoing, the output voltage from operational amplifier 26 is made to equal reference voltage $E_S$ so as to permit commencement of rotation of the motor driving the record disc. As the record disc is accelerated, and while its linear velocity at the location being scanned is still lower than the desired constant linear velocity, the maximum transition interval in output signal $S_O$ will be longer than 5.5 T with the result that the output of NAND gate 232 will be "0" and, accordingly, the output VS of D flip-flop 233 will continue to be "0" so that the voltages at opposite sides of capacitor 25 will remain zero. Accordingly, the rotational speed of the motor driving the record disc will be increased and eventually the linear velocity of the record disc at the location being scanned will near the predetermined or desired linear velocity so that the maximum transition interval in the reproduced signal $S_O$ will near 5.5 T.

When the rotational speed of the motor driving the record disc is further increased so that the actual linear velocity just exceeds the desired value, the maximum transition interval becomes smaller than 5.5 T and, in consequence thereof, output signal $M_1$ from MM 235 clears counter 231 at the beginning of a frame TA or TB to restore NAND gate 232 to its value "1". In response to the foregoing, output VS of D flip-flop 233 becomes "1" so that a discharge current flows from capacitor 25C and a negative electric potential is developed at the point P. In response to such negative electric potential at point P, the output from operational amplifier 26 becomes greater than the reference voltage $E_S$ and, in response thereto, the rotational velocity of the motor is decreased for correspondingly lowering the linear velocity at the location being scanned to the desired value. In thus lowering the linear velocity, if the maximum transition interval in the reproduced signal $S_O$ becomes slightly larger than 5.5 T, output VS of D flip-flop 233 becomes "0" so that a charge current flows from operational amplifier 250 toward capacitor 25C and, as a result of such charge current, the electric potential at point P is raised in the positive direction so as to correspondingly increase the rotational velocity of the motor for restoring the linear velocity at the scanned location to the desired constant value. In the steady state of the reproducing apparatus, that is, when the linear velocity is constant at the location being scanned, the signal VS from D flip-flop 233 repeats the states or levels "1" and "0" properly in each frame period TA in accordance with the accuracy of counter 231 in detecting the transition interval of 5.5 T. Accordingly, in association with the previously described time constant determined by resistor 25R and capacitor 25C, the voltage across capacitor 25C becomes a zero voltage so long as the desired constant linear velocity is maintained.

In the velocity servo circuit 20V of FIG. 5, diode 29 prevents reverse rotation of the motor driving the record disc. More particularly, if the electric potential at point P was allowed to become a positive voltage larger than the reference voltage $E_S$, the output of operational amplifier 26 would become a negative voltage by which the motor driving the record disc would be made to rotate in the reverse direction. However, since the diode 29 is connected between point P and ground and is conductive in the direction toward the latter, any tendency of the electric potential at point P to become a positive voltage causes diode 29 to become conductive with the result that the voltage at point P cannot rise above zero and, therefore, reverse rotation of the motor is blocked. Further, the polarity of the signal $S_O$ applied from comparator 3 to detecting circuit 23 when a disc is not loaded in the reproducing apparatus is selected so as to prevent rotation of the motor at a time when a record disc is absent from the reproducing apparatus.

In the asymmetry correction circuit 20A of FIG. 5, the outputs of AND gates 24C and 24D are applied to inverting and non-inverting input terminals, respectively, of an operational amplifier 270, and the output of this operational amplifier is connected through a resistor 27R and a capacitor 27C, in series, to ground. The operational amplifier 270, resistor 27R and capacitor 27C constitute the voltage generator 27 of FIG. 3 from which the threshold voltage $V_T$ is derived at a junction point between resistor 27R and capacitor 27C.

During each frame period TB in which switching signal $\overline{HF}$ is "1", asymmetry correction circuit 20A of FIG. 5 operates as follows: When the output signal VS from D flip-flop 233 is "1" that is, when the detected maximum transition interval of a negative polarity portion of output signal $S_O$ is no greater than 5.5 T, the outputs of AND gates 24C and 24D become "0" and "1", respectively. Due to the fact that the output "0" of AND gate 24C is fed to the inverting input terminal of operational amplifier 270 and the output "1" of AND gate 24D is applied to the non-inverting input terminal of operational amplifier 270, the operational amplifier 270 has a positive output at this time. As a result of the foregoing, operational amplifier 270 supplies a charge current through resistor 27R to capacitor 27C. On the other hand, when the maximum transition interval of the negative polarity portions of output signal $S_O$ is larger than 5.5 T during a frame period TB, signal VS is "0" and the outputs of AND gates 24C and 24D become "1" and "0", respectively. As a result of the foregoing, operational amplifier 270 then produces a negative output so that a discharge current flows from capacitor 27C through resistor 27R. By reason of the described flow of charging and discharging currents through resistor 27R, the voltage across capacitor 27C, which is used as the threshold voltage applied to comparator 3 in FIG. 3, is suitably varied for ensuring that the maximum transition interval of the negative polarity portions of output signal $S_O$ in each frame period TB is maintained precisely at 5.5 T, and thus equal to the maximum transition interval of the positive polarity portions of output signal $S_O$ in each frame period TB so as to correct for asymmetry.

In order to avoid undesirable oscillation in the circuits, the charge-and-discharge current iv of capacitor 25C, the charge-and-discharge current ia of capacitor 27C, and the capacities $C_b$ and $C_a$ of capacitors 25C and 27C, respectively, are preferably selected so as to satisfy the following inequality:

$$iv \times 1/C_v >> ia \times 1/C_a \tag{1}$$

In the particular arrangement of the phase servo circuit 30 shown on FIG. 5, the phase servo signal forming circuit 34 of FIG. 3 is generally comprised of flip-flop circuits 341 and 342, an AND gate 343 and a D flip-flop circuit 344. More particularly, the frame period reference signal SFX is supplied from frequency divider 32

Figure 6A:
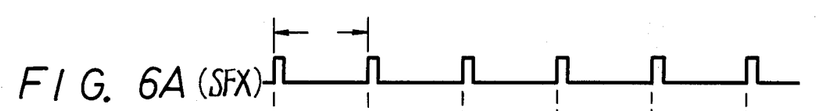
FIGS. 6A-6M are waveform diagrams to which reference will be made in explaining the operation of the circuit shown on FIG. 5.

(FIG. 3) to flip-flop circuit 341 which, at its output $\overline{Q}$, provides a signal $F_1$ (FIG. 6B) which is inverted or changes its polarity at each rise of reference signal SFX (FIG. 6A). The signal SFG (FIG. 6C) of the frame period is supplied from extractor circuit 35 (FIG. 3) to flip-flop circuit 342 which provides, at its output $\overline{Q}$, a signal $F_2$ (FIG. 6D) which is inverted at each rise of the signal SFG. The signals $F_1$ and $F_2$ are supplied to respective inputs of AND gate 343 so that the latter provides an output signal $A_1$ (FIG. 6E) which is "1" when signals $F_1$ and $F_2$ are simultaneously "1" so that the widths of the intervals during which signal $A_1$ is "1" are indicative of the phase difference between signals $F_1$ and $F_2$. The signals $F_1$ and $F_2$ are further applied to D flip-flop circuit 344 by which the state of the signal $F_2$ is sampled at the time when signal $F_1$ rises so that, at the output Q of D flip-flop 344 there is obtained a signal UD either at the level "0" (FIG. 6F) or at the level "1" (FIG. 6I). The output signal $A_1$ from AND circuit 343 is applied to respective inputs of AND circuits 361 and 362, and the output UD of D flip-flop 344 is applied directly to AND gate 361 and through an inverter 345 to AND gate 362.

Figure 6B:
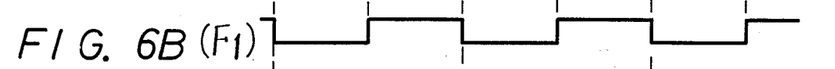
Figure 6C:
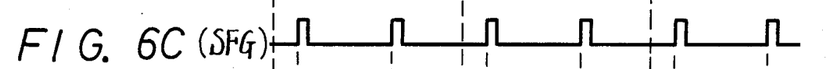
Figure 6D:
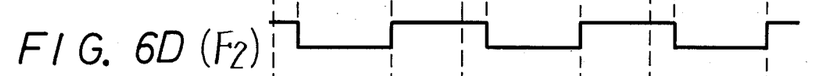
Figure 6E:
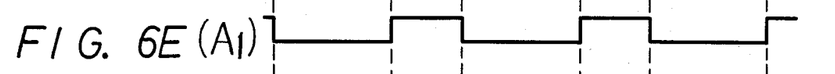
Figure 6F:
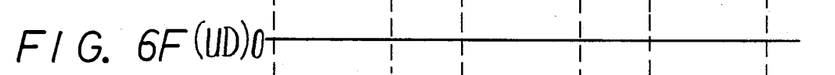
Figure 6G:
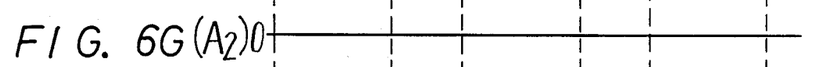
Figure 6H:
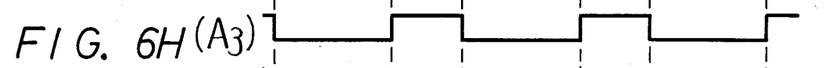
Figure 6I:
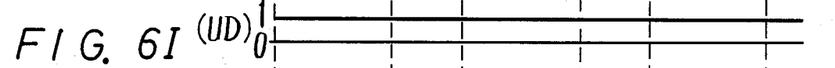
Figure 6J:
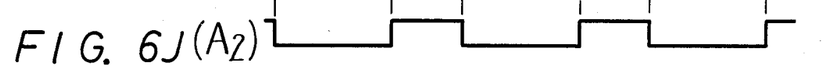
Figure 6K:
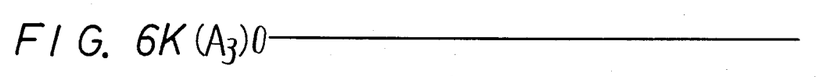
Figure 6L:
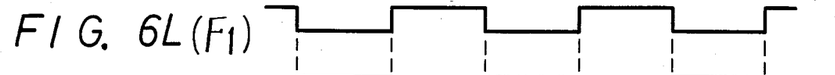
Figure 6M:
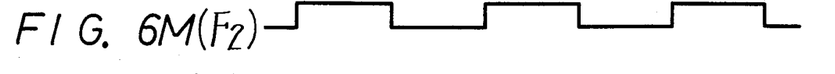

When the phase difference between signals SFX and SFG becomes 180°, the corresponding signals $F_1$ and $F_2$ from flip-flops 341 and 342 are in the states shown on FIGS. 6L and 6M, that is, there are no intervals in which their positive polarity portions overlap, so that output $A_1$ from AND gate 343 is then "0" continuously. The phase servo circuit 30 of FIG. 5 operates to maintain a 180° phase difference between signals SFX and SFG. However, when the signals SFX and SFG are out of phase by something other than 180°, for example, when signals SFX and SFG have waveforms as shown on FIGS. 6A and 6C, respectively, then the output signals $F_1$ and $F_2$ from flip-flop circuits 341 and 342 have a phase difference other than 180°, for example, as shown on FIGS. 6B and 6D, and, for the phase relationship there illustrated, D flip-flop circuit 344 provides its output UD at the level "0", as shown on FIG. 6F. At the same time, the output signal $A_1$ of AND gate 343 becomes "1" for each interval in which signals $F_1$ and $F_2$ are simultaneously at the "1" level. Thus, the output signal $A_1$ is in the form of a pulse (FIG. 6E) of a width corresponding to the phase relationship between signals SFX and SFG. Accordingly, with signals SFX and SFG having the phase relationship illustrated by FIGS. 6A and 6C, output $A_2$ from AND gate 361 remains "0", as shown on FIG. 6G, by reason of the "0" level of the output UD (FIG. 6F) from D flip-flop 344. However, such output UD, in being applied through inverter 345 to AND gate 362 causes the latter to provide an output $A_3$ (FIG. 6H) comprised of pulses of a width corresponding to the phase deviation between signals SFX and SFG. In that portion of the circuit shown on FIG. 5 which corresponds to voltage generator 36 of FIG. 3, the outputs $A_2$ and $A_3$ of AND gates 361 and 362 are applied to inverting and non-inverting input terminals, respectively, of an operational amplifier 360 and the output of the latter is connected through a resistor 36R and a capacitor 36C, in series, to ground. Moreover, the phase control voltage is derived from a junction point between resistor 36R and capacitor 36C and which is connected through resistor 37 to a junction point between resistor 28 and the inverting input terminal of operational amplifier 26. During each interval when the output $A_3$ of AND gate 362 is "1" while the output $A_2$ of AND gate 361 remains at "0", as on FIGS. 6H and 6G, respectively, a charge current flows from amplifier 360 through resistor 36R so as to increase the voltage across capacitor 36C which has the affect, in operational amplifier 26 and in the motor control circuit connected with the output of the latter, of restoring signal SFG to a condition out of alignment with signal SFX by 180°.

If the phase relationship of signals SFX and SFG is altered, for example, if the signals SFX and SFG have the waveforms shown on FIGS. 6C and 6A, respectively, the output $A_1$ of AND gate 343 will continue to be as shown on FIG. 6E, but the outputs $F_1$ and $F_2$ of flip-flops 341 and 342 will now have the waveforms shown on FIGS. 6D and 6B, respectively, with the result that output UD of D flip-flop circuit 344 will become "1", as shown on FIG. 6I. Therefore, with the phase relationship of signals SFX and SFG being here described, the output $A_2$ of AND gate 361 becomes a pulse (FIG. 6J) with a pulse width corresponding to the phase deviation between signals SFX and SFG, while the output $A_3$ from AND gate 362 becomes "0" as shown on FIG. 6K. Thus, during each pulse of output $A_2$ on FIG. 6J while output $A_3$ remains at "0", a discharge current flows from capacitor 36C through resistor 36R and the resulting change in the phase control voltage applied through resistor 37 acts again to restore signal SFG to a condition out of alignment with the reference signal SFX by 180°.

It will be appreciated from the foregoing that the rotational speed of the motor driving the record disc is controlled so that the signals $F_1$ and $F_2$ from flip-flops 341 and 342 will be a 180° out of phase, as on FIGS. 6L and 6M, in which condition the voltage across capacitor 36C is at the zero level.

In accordance with this invention, the resistor 36R and capacitor 36C are selected so that the time constant determined thereby will be substantially smaller than the time constant determined by resistor 25R and capacitor 25C. Thus, after the rotational velocity of the motor has been controlled by velocity servo circuit 20V to provide the desired constant linear velocity at the location where the record disc is being scanned, the motor and record disc are rotated such that the clock extracted from the reproduced signal is phase-locked to the reference clock or signal SFX, while the velocity servo circuit continues to be active to correct for any large or gross fluctuation in the rotation of the record disc.

In order to ensure that the phase servo circuit 30 will only become active after velocity servo circuit 20V has been effective to achieve the rotational velocity of the motor driving the record disc which corresponds to the desired constant linear velocity, the circuit arrangement of FIG. 5 is further shown to include a counter 41 having a clear terminal CL receiving the frame synchronizing signal SF extracted from output signal $S_O$ by extractor 35 (FIG. 3), and a clock terminal CK supplied with the signal SFG of the frame period and which is nearly synchronized with the frame synchronizing signal SF. As earlier noted, frame synchronizing signal SF is not extracted from output signal $S_O$ by extracting circuit 35 on FIG. 3 until the rotational speed of the motor driving the record disc has been captured or locked at a value corresponding to the desired linear velocity. Thus, until such constant linear velocity is achieved, extracting circuit 35 produces only the signal SFG, the pulses of which are counted by counter 41. When the number of pulses of signal SFG counted by counter 41 has reached a predetermined value, for example, the number "8" so as to avoid any erroneous operation by reason of noise or the like, an output $Q_D$ of counter 41 becomes "1". Such output $Q_D$ of counter 41 is supplied through an inverter 42 to respective inputs of AND gates 361 and 362. Accordingly, when output $Q_D$ of counter 41 becomes "1" after the counting of eight pulses of signal SFG, AND gates 361 and 362 are closed to prevent operation of phase servo circuit 30.

However, when the rotational velocity of the motor driving the record disc is captured or locked so as to provide the desired constant linear velocity, extracting circuit 35 of FIG. 3 extracts synchronizing signal SF from output signal $S_O$ so that counter 41 is thereafter cleared by each extracted frame synchronizing signal SF for ensuring that output $Q_D$ of counter 41 remains at the level "0" for opening AND gates 361 and 362 and thereby enabling the commencement of operation of phase servo circuit 30.

If, as a result of dropout, more than eight of the frame synchronizing signals SF are dropped after the rotation velocity of the motor has been locked to the desired constant linear velocity, it is possible that velocity servo circuit 20V and asymmetry correction circuit 20A, as described above, could misoperate. In order to avoid such misoperation, the output $Q_D$ of counter 41 is also applied to monostable multivibrator (MM) 43 for triggering the latter at the rise of output $Q_D$, whereupon the output Q of MM 43 becomes "1". Such Q output from MM 43 and output $Q_D$ from counter 41 are applied to respective inputs of a NAND gate 44 which has its output connected to respective inputs of AND gates 24A, 24B, 24C and 24D. By reason of the foregoing, in the absence of a number of frame synchronizing signals SF sufficient to cause output $Q_D$ of counter 41 to become "1", the output from NAND gate 44 becomes "0" for the duration of the period corresponding to the time constant of monostable multivibrator 43 so that AND gates 24A–24D are thereby held closed to prevent operation of both velocity servo circuit 20V and asymmetry correction circuit 20A. At the conclusion of the time period during which the output Q of monostable multivibrator 43 is "1", velocity servo circuit 20V and asymmetry correction circuit 20A are both restored to their operative conditions provided, of course, that counter 41 has not again counted eight signals SFG without the occurrence of an extracted frame synchronizing signal SF for clearing counter 41.

It will be appreciated from the above that, since the output of comparator 26 in servo circuit 20V is used as the velocity servo or control signal when the record disc is being driven at the desired constant linear velocity and the time constant of such velocity servo circuit 20V is selected to be substantially larger than the time constant of the phase servo circuit 30, the servo loop or system according to this invention does not produce oscillation with the result that the servo operation is stable and the servo gain can be improved. Moreover, since the phase servo circuit 30 can be made operative simultaneously with the velocity servo circuit 20V when the record disc is being rotated at the desired constant linear velocity, the arrangement and operation of the servo system according to this invention are greatly simplified, as compared with the arrangement shown in FIG. 1, in which the phase servo circuit is made operative only as an alternative to the operation of the velocity servo circuit even when the record disc is being driven at the desired linear velocity.

Furthermore, since the servo system according to this invention employs the single detecting circuit 23 to detect the maximum transition interval or the minimum transition interval for both the velocity servo circuit 20V and the asymmetry correction circuit 20A which are operated in a time-sharing manner, the circuit arrangement of the servo system according to the invention is substantially simplified. In connection with the foregoing, it will be noted that the output of velocity servo circuit 20V for determining the rotational speed of the record disc necessary to achieve a constant linear velocity at the location where the pick-up scans the record disc will vary substantially as the pick-up moves radially across the disc. On the other hand, the output of asymmetry correction circuit 20A is determined substantially by the conditions of manufacturing of the particular record disc being reproduced and which are substantially the same for the entire record, so that the output of circuit 20A will vary only slightly, if at all, with changes in the location on the record disc where the pick-up is scanning the same. Therefore, when velocity servo circuit 20V and asymmetry correction circuit 20A are provided with parts in common, as in the described embodiment of this invention, neither of the circuits 20V and 20A will be made to oscillate by the other because the constants of the circuits 20V and 20A are inherently substantially different from each other.

Having described in detail a particular embodiment of this invention with reference to the accompanying drawings, it is to be understood that the invention is not limited to that precise embodiment, and that various modifications and changes may be effected therein by one skilled in the art without departing from the scope or spirit of the invention as defined in the appended claims.

What is claimed is:

1. In an apparatus for reproducing from a record medium a recorded PCM signal in a run length limited code; the combination of transducer means for providing a reproduced signal from the record medium as the latter is driven;

means for comparing said reproduced signal with a first reference signal so as to produce an output signal corresponding to said reproduced signal and having portions of opposite polarities;

a detecting circuit for detecting a transition interval between transitions from one to the other of said opposite polarity portions of said output signal and for producing a corresponding detecting signal;

a velocity servo circuit including velocity comparator means for comparing said detecting signal with a second reference signal which corresponds to a predetermined limit of said transition interval when the record medium is driven at a predetermined velocity and producing a corresponding velocity control signal for maintaining the record medium at said predetermined velocity, and a first time constant circuit connected to said velocity comparator means for determining the rate of response of said velocity servo circuit to any deviation from said predetermined velocity; and a phase servo circuit including phase locked loop means for producing a phase signal from said reproduced signal, oscillating means for providing a reference phase signal, phase comparator means for comparing said phase signal from said phase locked loop means with said reference phase signal and producing a corresponding phase control signal for maintaining a predetermined phase of said reproduced signal when said record medium is driven at said predetermined velocity, and a second time constant circuit connected to said phase comparator means for determining the rate of response of said phase servo circuit to any deviation from said predetermined phase and having a time constant smaller than that of said first time constant circuit.

2. An apparatus according to claim 1; further comprising a reference control circuit for establishing a level of said first reference signal such that said opposite polarity portions of said output signal have respective intervals which are equal to each other.

3. An apparatus according to claim 2; further comprising means alternately supplying said opposite polarity portions of the output signal to said detecting circuit and correspondingly alternately applying said detecting signal to said velocity servo circuit and to said reference control circuit, respectively.

4. An apparatus according to claim 1; in which said recorded PCM signal includes frame synchronizing signals each constituted, in said output signal, by successive portions of opposite polarities having transition intervals which are equal to said predetermined limit thereof when said record medium is driven at said predetermined velocity; and further comprising a reference control circuit responsive to inequalities between said transition intervals of successive opposite polarity portions of said output signal for varying said first reference signal in a sense to make equal to each other said transition intervals of said successive opposite polarity portions of the output signal.

5. An apparatus according to claim 1; in which said recorded PCM signal includes frame synchronizing signals each constituted, in said output signal, by successive portions of opposite polarities having transition intervals which are equal to said predetermined limit thereof when said record medium is driven at said predetermined velocity, and each represented, in said output signal, by two successive portions of opposite polarities each having a maximum transition interval of said run length limited code; and further comprising a reference control circuit responsive to inequalities between said transition intervals of successive opposite polarity portions of said output signal for varying said first reference signal in a sense to make equal to each other said transition intervals of said successive opposite polarity portions of the output signal.

6. An apparatus according to claim 5; in which said record medium is a rotated record disc having said PCM signal recorded therein at various distances from the center of said disc, and said predetermined velocity is a constant linear velocity of said disc relative to said transducer means irrespective of the radial position of said transducer means from said center of the disc.

7. An apparatus according to claim 4; further comprising means for extracting said frame synchronizing signals from said output signal upon driving of said record medium at said predetermined velocity; and means responsive to a failure to extract said frame synchronizing signals to prevent operation of said phase servo circuit.

8. An apparatus according to claim 7; further comprising means responsive to said failure to extract said frame synchronizing signals for preventing operation of said velocity servo circuit and said reference control circuit.

9. An apparatus according to claim 1; in which said recorded PCM signal includes frame synchronizing signals; and further comprising means for extracting said frame synchronizing signals from said output signal, and means responsive to the failure to extract said frame synchronizing signals to prevent operation of said velocity servo circuit and said phase servo circuit.

10. An apparatus according to claim 1; further comprising means for composing said velocity control signal and said phase control signal to simultaneously influence the drive of the record medium.

11. An apparatus according to claim 1, in which said recorded PCM signal has successive frame periods, and said first time constant circuit includes means for setting the first time constant to be larger than each of said frame periods.

12. In an apparatus for reproducing from a record medium a recorded PCM signal in a run length limited code having successive odd and even numbered frame periods; the combination of:
transducer means for providing a reproduced signal from the record medium as the latter is driven;
means for comparing said reproduced signal with a first reference signal so as to produce an output signal corresponding to said reproduced signal and having portions of opposite polarities;
a reference control circuit for establishing a level of said first reference signal fed to said means for comparing such that said opposite polarity portions of said output signal have respective intervals which are equal to each other;
a detecting circuit for detecting a transition interval between transitions from one to the other of said opposite polarity portions of said output signal and for producing a corresponding detecting signal;
first switch means for applying said opposite polarity portions of said output signal to said detecting circuit during said odd and even numbered frame periods, respectively;
a velocity servo circuit including velocity comparator means for comparing said detecting signal with a second reference signal which corresponds to a predetermined limit of said transition interval when the record medium is driven at a predetermined velocity and producing a corresponding velocity control signal for maintaining the record medium at said predetermined velocity, and a first time constant circuit connected to said velocity comparator means for determining the rate of response of said velocity servo circuit to any deviation from said predetermined velocity;
second switch means for applying said detecting signal to said velocity servo circuit and to said reference control circuit during said odd and even numbered frame periods, respectively; and
a phase servo circuit including phase locked loop means for producing a phase signal from said reproduced signal, oscillating means for providing a reference phase signal, phase comparator means for comparing said phase signal from said phase locked loop means with said reference phase signal and producing a corresponding phase control signal for maintaining a predetermined phase of said reproduced signal when said record medium is driven at said predetermined velocity, and a second time constant circuit connected to said phase comparator means for determining the rate of response of said phase servo circuit to any deviation from said predetermined phase and having a time constant smaller than that of said first time constant circuit.

13. In an apparatus for reproducing from a record medium a recorded PCM signal in a run length limited code; the combination of:

transducer means for providing a reproduced signal from the record medium as the latter is driven;

means for comparing said reproduced signal with a first reference signal so as to produce an output signal corresponding to said reproduced signal and having portions of opposite polarities;

a detecting circuit for detecting a transition interval between transitions from one to the other of said opposite polarity portions of said output signal and for producing a corresponding detecting signal, said detecting circuit including counting means operative to count clock pulses, output means providing said detecting signal at a first level when the count of said clock pulses by said counting means is below a predetermined number corresponding to a maximum transition interval of said opposite polarity portions of the output signal and changing-over said detecting signal to a second level when said count of the clock pulses exceeds said predetermined number, said counting means being enabled to count only when said detecting signal is at said first level, means for clearing said counting means at transitions between said opposite polarity portions of said output signal, and means to bar clearing of said counting means at said transitions in response to said second level of said detecting signal;

a velocity servo circuit including velocity comparator means for comparing said detecting signal with a second reference signal which corresponds to a predetermined limit of said transition interval when the record medium is driven at a predetermined velocity and producing a corresponding velocity control signal for maintaining the record medium at said predetermined velocity, and a first time constant circuit connected to said velocity comparator means for determining the rate of response of said velocity servo circuit to any deviation from said predetermined velocity; and a phase servo circuit including phase locked loop means for producing a phase signal from said reproduced signal, oscillating means for providing a reference phase signal, phase comparator means for comparing said phase signal from said phase locked loop means with said reference phase signal and producing a corresponding phase control signal for maintaining a predetermined phase of said reproduced signal when said record medium is driven at said predetermined velocity, and a second time constant circuit connected to said phase comparator means for determining the rate of response of said phase servo circuit to any deviation from said predetermined phase and having a time constant smaller than that of said first time constant circuit.

14. An apparatus according to claim 13; in which said recorded PCM signal is comprised of successive frame periods, and said detecting circuit further includes additional means operative for clearing said counting means near to the commencement of each of said frame periods in said output signal.

15. An apparatus according to claim 14; in which said detecting circuit further includes memory means activated immediately before the operation of said additional means for clearing the counting means so as to store in said memory means for the next frame period the level of said detecting signal.

16. An apparatus according to claim 15; in which said successive frame periods are odd and even numbered, respectively, and said means for clearing the counting means at said transitions is responsive to positive and negative polarity portions of said output signal during said odd and even numbered frame periods, respectively; and further comprising a reference control circuit for establishing a level of said first reference signal such that said positive and negative polarity portions of said output signal have equal intervals, and means applying said detecting signal, as stored in said memory means, to said velocity servo circuit and to said reference control circuit during said odd and even numbered frame periods, respectively.

17. An apparatus according to claim 16; in which said recorded PCM signal includes frame synchronizing signals; and further comprising means for extracting said frame synchronizing signals from said output signal upon driving of said record medium at said predetermined velocity, and means barring operation of said phase servo circuit upon the failure to extract at least a predetermined number of said frame synchronizing signals.

18. An apparatus according to claim 17 further comprising means responsive to said failure to extract at least said predetermined number of frame synchronizing signals for preventing operation of said velocity servo circuit and said reference control circuit by said detecting signal stored in said memory means.

19. An apparatus according to claim 18; further comprising first and second resistors through which said velocity control signal and said phase control signal are added for controlling the movements of said record medium.

* * * * *